United States Patent Office 2,729,647
Patented Jan. 3, 1956

2,729,647

PROCESS FOR PREPARING CITRAZINIC ACID

Abraham Bavley, Brooklyn, and Edgar K. Hamilton, Merrick, N. Y., assignors to Chas. Pfizer & Co., Inc., Brooklyn, N. Y., a corporation of Delaware No Drawing. Application September 20, 1952, Serial No. 310,734

5 Claims. (Cl. 260—295)

This invention relates to a process for preparing citrazinic acid and more particularly, to a process for preparing citrazinic acid directly from citric acid and ammonia.

Prior to this invention, it has been the practice to produce citrazinic acid by treatment of an ester of citric acid with ammonium hydroxide under elevated conditions of temperature and pressure, a process well known in the art. However, this process obviously must be preceded by the formation of an ester of citric acid, particularly the methyl ester, whether the ester is separately produced or produced in the same vessel in which the reaction with ammonia takes place. As desirable as it is to eliminate this step of ester formation, it has not heretofore been believed possible to synthesize citrazinic acid directly from citric acid in any appreciable yields.

It is therefore an object of this invention to provide an improved process for preparing citrazinic acid.

A further object is to prepare citrazinic acid directly from citric acid and ammonia.

A still further object is the preparation of citrazinic acid by a process characterized by excellent yield and conversion of citric acid to citrazinic acid.

These and other objects are accomplished by the present invention wherein citrazinic acid is prepared by reacting citric acid with concentrated aqueous ammonia at an elevated temperature.

The reaction is carried out in an autoclave or other suitable pressure vessel, preferably glass-lined and equipped with means for cooling, heating and agitation. An aqueous solution of citric acid is conveniently prepared in this vessel, or added thereto, and anhydrous ammonia is then introduced to the mixture until the desired concentration is obtained in situ. However, the ammonia may be introduced in several other ways. For example, one may simply employ ordinary ammonium hydroxide of the desired quantity and concentration. Commercial 29 percent ammonium hydroxide (26° Baumé) is quite suitable for this purpose. The citric acid may then be employed as a solid and dissolved in the aqueous ammonia. More advantageously, ammonium hydroxide of greater concentration may be prepared by fortifying a given ammonium hydroxide solution with anhydrous ammonia, either before or after its introduction to the vessel. However, this fortification is preferably conducted in situ. When the ammonium hydroxide is thus prepared, or when an ammoniacal solution is fortified as above described, it is necessary that the mixture be cooled or subjected to suitable pressure until all of the anhydrous ammonia has been introduced into solution. The amount of heat evolved by addition of the ammonia may be reduced by employing ammonium citrates, namely the mono-, di- and triammonium citrates in lieu of citric acid. Thus, the invention in its broadest aspects is concerned with the production of citrazinic acid by treatment of citric acid or its ammonium salts with aqueous ammonia. The term "ammonium citrate" as used hereafter is intended to include the mono-, di- and tri- salts, unless otherwise indicated.

The concentration of the ammonia and its ratio to the citric acid can vary considerably, but there should generally be a substantial molar excess of the former. However, in considering these variables, it will be appreciated that allowance must be made for the ammonia combined in the form of ammonium citrates, or the like, whether ammonium citrate is employed as a starting material or is formed during the addition of ammonia to the reaction mixture. Accordingly, the amount of ammonia and its molar ratio to the citric acid are expressed on the total ammonia content of the reaction mixture. On this basis, the amount of ammonia may vary from 20 to 75 percent by weight of the total water and ammonia, whether free or combined, in the reaction mixture. Furthermore, the molar ratio of ammonia to citric acid may vary from 5 to 35 mols ammonia per mol of citric acid. The term concentrated aqueous ammonia as used herein is intended to mean aqueous ammonia containing ammonia in an amount of at least 20 percent by weight of the total water and ammonia, whether free or combined, in the reaction mixture. Excellent yields have been obtained with 23 mols ammonia per mol of citric acid when employing 54 percent aqueous ammonia.

The reaction can be conducted at a broad range of temperatures, say from 125° C. to 175° C., depending upon the concentration of ammonia and its ratio to the citric acid, among other factors. Temperatures in the order of 140° C. to 160° C. are preferred for optimum results.

The time of reaction may vary considerably, but a time of about 6 to 36 hours is usually adequate to obtain the desired result. In general, the longer the reaction is conducted, the greater the yield of citrazinic acid, although good yields are obtained when a period of 18 to 36 hours is employed.

The reaction is conducted under superatmospheric pressure, to maintain the desired concentration of ammonia. In general, the higher the concentration of the ammonia, the greater should be the pressure at a given reaction temperature. The pressure may therefore range from 200 to 1200 pounds per square inch and higher, depending upon the reaction temperature and the concentration of ammonia used. It will be appreciated that the proportions of the reactants and the conditions of reaction are interdependent, and therefore, may each vary considerably, the dominant limiting factor being the physical capabilities of the equipment involved.

After the citric acid has been reacted with the ammonia for a sufficient period, any excess ammonia is removed by distillation under reduced pressure. Additional water may then be added, if desired, to facilitate further treatment. Thereafter, the solution of the ammonium salt of citrazinic acid formed by the reaction is preferably heated to boiling at atmospheric pressure to promote better crystallization and filtering of the citrazinic acid. The citrazinic acid is released by acidifying the hot solution with a suitable acid, such as 50 percent sulfuric acid, whereupon crystallization occurs. This mixture is then cooled, adjusted to a pH of about 1.5 to 1.9 with more sulfuric acid, and filtered after standing for a period sufficient to insure substantially complete crystallization. The filtered citrazinic acid crystals are then washed with water to remove the mother liquor and dried below 60° C. under vacuum or in the presence of an inert atmosphere, such as nitrogen. Care should be taken during the entire process to avoid the presence of air, since undesirable oxidation of the citrazinic acid may result therefrom.

Although substantially pure citrazinic acid can be produced by the above process, the final reaction product before drying may be heated with 50 to 70 percent sulfuric acid to convert any citrazinamide that may have been formed into the desired citrazinic acid. If the ammonium salt of citrazinic acid is desired, it can, of course, be conveniently recovered from the reaction mixture by methods well known in the art.

The invention is further illustrated by the following examples, wherein the percent conversion and percent yield are defined as follows:

$$\text{Percent conversion} = \frac{\text{mols citrazinic acid produced}}{\text{mols citric acid charged}} \times 100$$

$$\text{Percent yield} = \frac{\text{mols citrazinic acid produced}}{\text{mols citric acid consumed}} \times 100$$

EXAMPLE I

An amount of 16.4 grams of anhydrous citric acid was slowly mixed with 51 grams of 28% ammonium hydroxide in each of two glass beakers surrounded by a cooling bath. The molar ratio of ammonia to citric acid was about 10:1. The mixtures thus formed were charged respectively into each of two 100 ml. stainless steel bombs. The bombs were then closed and immersed in an oil bath maintained at 140° C.±2° C. At 18 hours and 36 hours, respectively, a bomb was withdrawn from the bath and plunged into cold water to cool it rapidly to room temperature.

After cooling, the contents of each bomb were quickly transferred to a glass flask and heated in an oil bath under a nitrogen atmosphere until the temperature of the mixture rose to 85 to 90° C. Thereafter, the volume was adjusted to the original level by adding water and the mixture was heated to boiling. Enough 50% by volume sulfuric acid was then added to adjust the pH to between 2 and 4, and the mixture was cooled to room temperature at which the pH was adjusted to 1.5 to 1.9 with additional sulfuric acid. The precipitate of citrazinic acid thus formed was filtered off, washed free of mother liquor with water, and dried in vacuo at 50° C. The amount of citrazinic acid formed and the percent conversion of citric acid thereto for the respective 18 hour and 36 hour runs was as follows:

|  | 18 hours | 36 hours |
|---|---|---|
| Weight of citrazinic acid, grams | 2.5 | 4.0 |
| Conversion, percent | 19.3 | 30.8 |

EXAMPLE II

Four hundred ml. of 28 percent aqueous ammonia were saturated with anhydrous ammonia gas at 0° C. to form ammonium hydroxide of 40 to 45 percent ammonia. To this were slowly added 65 grams anhydrous citric acid while cooling and stirring the mixture, which was then charged into a stainless steel rocking bomb.

The bomb was closed and heated for about 18 hours at 140° C., after which it was permitted to cool. Upon cooling, the contents were transferred to a flask from which the excess ammonia was removed by vacuum under a nitrogen atmosphere. Thereafter, the reaction mixture was treated as in Example I, and the citrazinic acid crystals filtered off were dried at about 80° C. under nitrogen at atmospheric pressure. An amount of 22.4 grams of citrazinic acid were thus produced, as confirmed by the following analysis:

Citrazinic acid—

| | Per cent |
|---|---|
| By u. v. absorption | 100.6 |
| By direct titration | 95.4 |

Total nitrogen—

| | Per cent |
|---|---|
| Theory | 9.0 |
| Found | 9.55 |

The yield of citrazinic acid was found to be 65.4 percent, while the conversion of citric acid to citrazinic acid was 42.8 percent, an amount of 22.5 grams citric acid being retained by the mother liquor.

EXAMPLE III

Sixty grams of anhydrous citric acid were dissolved in 107 grams of water and transferred to a glass absorption tower fitted with a gas distributor. The tower was immersed in a methanol-Dry-Ice bath maintained between 0° and —20° C., and anhydrous ammonia gas was passed into the solution until 123 grams of anhydrous ammonia had been added, giving an ammonia concentration equivalent to an aqueous solution of 53.5 percent ammonia, and a molar ratio of about 23 mols ammonia per mol of citric acid.

The resulting slurry was charged to a stainless steel rocking bomb and reacted as in Example II, maintaining the temperature, however, at 150° C.±2° C. throughout the 18 hour reaction period. A pressure of 650 pounds per square inch gauge was observed at this temperature. Thereafter, the product so obtained was further treated as in Example II to produce 24.2 grams of citrazinic acid, representing a conversion of 50 percent.

EXAMPLE IV

The procedure described in Example III was repeated with 53.5 percent ammonia at 140° C. for 18 hours, using a molar ratio of 11 mols ammonia per mol of citric acid. The conversion of citric acid to citrazinic acid was 36.8 percent as compared with 43 percent when the ratio was 23 to 1, as in Example II.

Although the percent conversion of citric acid to citrazinic acid and the percent yields obtained render the above process economically sound, it is possible to effect substantial improvements in overall yield by recycling the mother liquor. This mother liquor contains a substantial portion of citric acid and/or derivatives thereof which are readily converted to citrazinic acid by the described methods after refortification with further ammonia, and, if desired, further citric acid. This recycling is most advantageously conducted on the so-called "continuous batch" basis. The following example illustrates the effect of such recycling.

EXAMPLE V

Initial reaction

A glass absorption tower fitted with a gas distributor was charged with 351 grams of 28 percent ammonium hydroxide. While the tower was immersed in a methanol-Dry Ice bath maintained at —10° to —15° C., anhydrous ammonia was bubbled therethrough until the solution appeared saturated at about 0° C. At this point, the weight of ammonia absorbed was 96 grams, equivalent to an ammonia concentration of 43.5 percent by weight and a molar ratio of 16.5 mols ammonia per mol of citric acid.

From this solution 231 grams were taken and mixed with 69 grams of anhydrous citric acid while cooling in a suitable bath. This mixture was transferred to a precooled 500 ml. stainless steel rocking bomb and washed in with 46 grams of additional concentrated aqueous ammonia from the above.

The bomb was closed and heated by an electric jacket for 18 hours at 140° C.±20° C., after which it was permitted to cool to 122° C. When cool, the bomb was discharged into a suitable glass flask and the ammonia removed by vacuum distillation under nitrogen. The reaction mixture was then further treated as in Example II to give 19.4 grams of citrazinic acid. The volume of mother liquor remaining was measured and a sample was analyzed for citric acid and amides thereof, the total equivalent citric acid content being 38.6 grams. At this point the conversion was computed at 35.6 percent and the yield at 79.3 percent.

Recycle

The mother liquor (440 ml.) was concentrated in vacuo below 30° C. until crystals of ammonium sulfate appeared and the volume was reduced to 190 ml. The pH of the concentrate was then adjusted to 7.5 with 53 ml. of 28 percent aqueous ammonia, and the mixture was cooled to −10° C. without further crystallization of ammonium sulfate. The slurry so produced was transferred to the absorption tower described above. After cooling the same between 0° and −5° C., 141 grams anhydrous ammonia were absorbed and then 27 grams anhydrous citric acid were slowly mixed therewith.

The resulting mixture was charged into a rocking bomb and processed as described above, taking particular care to use sufficient water to wash out any ammonium sulfate coprecipitated, resulting in 24 grams of citrazinic acid at a conversion of 49.8 percent, and a yield of 61 percent, based on 10.8 grams citric acid remaining in the mother liquor.

The present invention thus provides a new and useful process for producing citrazinic acid directly from citric acid in an efficient and economic manner, thereby completely eliminating the step of ester formation which has heretofore been believed to be essential. The citrazinic acid so produced is of a high order of purity, as high as 98 percent pure under proper conditions, and may be used for many purposes well known in the art, notable among which is as an intermediate in the preparation of the anti-tubercular agent, isonicotinic acid hydrazide.

Resort may be had to such modifications and equivalents as fall within the spirit of the invention and the scope of the appended claims.

We claim:

1. In a process for preparing citrazinic acid, the steps of reacting in a closed vessel with a molar excess of concentrated aqueous ammonia at a temperature within the range 125° to 175° C. and at autogenous pressure a material selected from the group consisting of citric acid and ammonium citrate, acidifying resulting solution to precipitate citrazinic acid, and recovering citrazinic acid so precipitated.

2. In a process for preparing citrazinic acid, the steps of reacting in a closed vessel ammonium citrate with a molar excess of concentrated aqueous ammonia at a temperature with the range 125° to 175° C. and under autogenous pressure, acidifying resulting solution to precipitate citrazinic acid, and recovering citrazinic acid so precipitated.

3. In a process for preparing citrazinic acid, the steps of reacting in a closed vessel citric acid with a molar excess of concentrated aqueous ammonia at a temperature within the range 125° to 175° C. and under autogenous pressure, acidifying resulting solution to precipitate citrazinic acid, and recovering citrazinic acid so precipitated.

4. A process for preparing ammonium citrazinate which comprises the steps of reacting in a closed vessel citric acid with concentrated aqueous ammonia containing from about 20 to 75% ammonia by weight in an amount of from about 5 to 35 mols of ammonia per mol of citric acid at a temperature of from about 125° to 175° C. and under autogenous pressure, and recovering ammonium citrazinate thereby produced.

5. A process for preparing citrazinic acid which comprises the steps of reacting in a closed vessel citric acid with concentrated aqueous ammonia containing from about 20 to 75% ammonia by weight in an amount of from about 5 to 35 mols of ammonia per mol of citric acid at a temperature of from about 125° to 175° C. and under autogenous pressure, acidifying resulting solution to precipitate citrazinic acid, and recovering citrazinic acid so precipitated.

References Cited in the file of this patent

Sabanin et al.: Zeitschrift fur Analytische Chemie, vol. 17 (1878), pp. 73–76.

Behrmann et al.: Berichte, vol. 17 (1884), pp. 2687–90.

Easterfield et al.: J. Chem. Soc. of London, vol. 61 (1892), pp. 1003–09.

Easterfield et al.: J. Chem. Soc. of London, vol. 65 (1894), pp. 28–31.